United States Patent
Baldwin et al.

(10) Patent No.: US 9,529,425 B2
(45) Date of Patent: Dec. 27, 2016

(54) DEVICE HOLD DETERMINATION USING BONE CONDUCTION

(71) Applicant: AT&T Intellectual Property I, L.P., Atlanta, GA (US)

(72) Inventors: Christopher Baldwin, Algonquin, IL (US); Brian S. Amento, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 110 days.

(21) Appl. No.: 14/482,091

(22) Filed: Sep. 10, 2014

(65) Prior Publication Data
US 2016/0071383 A1 Mar. 10, 2016

(51) Int. Cl.
| | |
|---|---|
| *H04B 3/36* | (2006.01) |
| *G06F 3/01* | (2006.01) |
| *G06F 3/00* | (2006.01) |
| *G06F 1/16* | (2006.01) |
| *A61M 21/00* | (2006.01) |

(52) U.S. Cl.
CPC ............. *G06F 3/011* (2013.01); *G06F 1/1698* (2013.01); *G06F 3/00* (2013.01)

(58) Field of Classification Search
CPC ...... G06F 3/0416; G06F 3/0412; G06F 3/041; G06F 3/0488; G06F 3/04883
USPC ................... 340/407.1; 345/174, 173; 600/28
See application file for complete search history.

(56) References Cited

U.S. PATENT DOCUMENTS

| | | | |
|---|---|---|---|
| 3,629,521 A | 12/1971 | Puharich et al. | |
| 4,048,986 A | 9/1977 | Ott | |
| 4,340,778 A | 7/1982 | Cowans et al. | |
| 4,421,119 A | 12/1983 | Pratt | |
| 4,720,607 A | 1/1988 | de Moncuit | |
| 4,754,763 A | 7/1988 | Doemland | |
| 4,799,498 A | 1/1989 | Collier | |

(Continued)

FOREIGN PATENT DOCUMENTS

| | | |
|---|---|---|
| AU | 2003257031 | 2/2004 |
| AU | 2007200415 | 8/2007 |

(Continued)

OTHER PUBLICATIONS

U.S. Office Action dated Aug. 25, 2015 in U.S. Appl. No. 11/586,142.

(Continued)

*Primary Examiner* — Jack K Wang
(74) *Attorney, Agent, or Firm* — Hartman & Citrin LLC

(57) ABSTRACT

Concepts and technologies are disclosed herein for device hold determination using bone conduction. According to one aspect, a device side transducer of a user device can receive a bone conduction signal from a user side transducer. The bone conduction signal can propagate through one or more bones of a user, such as one or more finger bones. An application can be executed by a processor of the user device to analyze the bone conduction signal to determine how the device is being held. In some embodiments, data regarding how the user device is being held by the user can be exposed to an application that is executable by the processor of the user device, an application external to the user device, an operating system that is executable by the user device, and/or a website.

18 Claims, 9 Drawing Sheets

(56) References Cited

U.S. PATENT DOCUMENTS

| | | |
|---|---|---|
| 5,024,239 A | 6/1991 | Rosenstein |
| 5,073,950 A | 12/1991 | Colbert et al. |
| 5,319,747 A | 6/1994 | Gerrissen et al. |
| 5,327,506 A | 7/1994 | Stites, III |
| 5,368,044 A | 11/1994 | Cain et al. |
| 5,495,241 A | 2/1996 | Doing et al. |
| 5,615,681 A | 4/1997 | Ohtomo |
| 5,664,227 A | 9/1997 | Mauldin et al. |
| 5,720,290 A | 2/1998 | Buhler |
| 5,749,363 A | 5/1998 | Ishii |
| 5,766,208 A | 6/1998 | Mcewan |
| 5,810,731 A | 9/1998 | Sarvazyan et al. |
| 5,836,876 A | 11/1998 | Dimarogonas |
| 6,024,711 A | 2/2000 | Lentle |
| 6,115,482 A | 9/2000 | Sears et al. |
| 6,135,951 A | 10/2000 | Richardson et al. |
| 6,151,208 A | 11/2000 | Bartlett |
| 6,213,934 B1 | 4/2001 | Bianco |
| 6,234,975 B1 | 5/2001 | Mcleod et al. |
| 6,336,045 B1 | 1/2002 | Brooks |
| 6,380,923 B1 | 4/2002 | Fukumoto |
| 6,396,930 B1 | 5/2002 | Vaudrey et al. |
| 6,409,684 B1 | 6/2002 | Wilk |
| 6,507,662 B1 | 1/2003 | Brooks |
| 6,580,356 B1 | 6/2003 | Alt et al. |
| 6,589,287 B2 | 7/2003 | Lundborg |
| 6,631,197 B1 | 10/2003 | Taenzer |
| 6,754,472 B1 | 6/2004 | Williams et al. |
| 6,783,501 B2 | 8/2004 | Takahashi et al. |
| 6,844,660 B2 | 1/2005 | Scott |
| 6,898,299 B1 | 5/2005 | Brooks |
| 7,010,139 B1 | 3/2006 | Smeehuyzen |
| 7,123,752 B2 | 10/2006 | Kato et al. |
| 7,148,879 B2 | 12/2006 | Amento et al. |
| 7,198,607 B2 | 4/2007 | Jamsen |
| 7,206,423 B1 | 4/2007 | Feng et al. |
| 7,232,416 B2 | 6/2007 | Czernicki |
| 7,370,208 B2 | 5/2008 | Levin et al. |
| 7,405,725 B2 | 7/2008 | Mohri et al. |
| 7,536,557 B2 | 5/2009 | Murakami et al. |
| 7,539,533 B2 | 5/2009 | Tran |
| 7,615,018 B2 | 11/2009 | Nelson et al. |
| 7,625,315 B2 | 12/2009 | Hickman |
| 7,648,471 B2 | 1/2010 | Hobson |
| 7,671,351 B2 | 3/2010 | Setlak et al. |
| 7,708,697 B2 | 5/2010 | Wilkinson et al. |
| 7,760,918 B2 | 7/2010 | Bezvershenko et al. |
| 7,778,848 B1 | 8/2010 | Reeves |
| 7,796,771 B2 | 9/2010 | Calhoun et al. |
| 7,878,075 B2 | 2/2011 | Johansson et al. |
| 7,914,468 B2 | 3/2011 | Shalon et al. |
| 7,918,798 B2 | 4/2011 | Wu |
| 8,023,669 B2 | 9/2011 | Segev et al. |
| 8,023,676 B2 | 9/2011 | Abolfathi et al. |
| 8,031,046 B2 | 10/2011 | Franza et al. |
| 8,098,129 B2 | 1/2012 | Falck et al. |
| 8,196,470 B2 | 6/2012 | Gross et al. |
| 8,200,289 B2 | 6/2012 | Joo et al. |
| 8,253,693 B2 | 8/2012 | Buil et al. |
| 8,270,637 B2 | 9/2012 | Abolfathi |
| 8,270,638 B2 | 9/2012 | Abolfathi et al. |
| 8,312,660 B1 | 11/2012 | Fujisaki |
| 8,348,936 B2 | 1/2013 | Trembly et al. |
| 8,421,634 B2 | 4/2013 | Tan et al. |
| 8,467,742 B2 | 6/2013 | Hachisuka et al. |
| 8,482,488 B2 | 7/2013 | Jannard |
| 8,491,446 B2 | 7/2013 | Hinds et al. |
| 8,500,271 B2 | 8/2013 | Howell et al. |
| 8,521,239 B2 | 8/2013 | Hosoi et al. |
| 8,540,631 B2 | 9/2013 | Penner et al. |
| 8,542,095 B2 | 9/2013 | Kamei |
| 8,560,034 B1 | 10/2013 | Diab et al. |
| 8,594,568 B2 | 11/2013 | Falck |
| 8,750,852 B2 | 6/2014 | Forutanpour et al. |
| 8,922,427 B2 | 12/2014 | Dehnie et al. |
| 9,386,962 B2 | 7/2016 | Dahl |
| 2001/0013546 A1 | 8/2001 | Ross |
| 2001/0051776 A1 | 12/2001 | Lenhardt |
| 2003/0048915 A1 | 3/2003 | Bank |
| 2003/0066882 A1 | 4/2003 | Ross |
| 2003/0125017 A1 | 7/2003 | Greene et al. |
| 2003/0133008 A1 | 7/2003 | Stephenson |
| 2004/0152440 A1 | 8/2004 | Yoda et al. |
| 2005/0210269 A1 | 9/2005 | Tiberg |
| 2006/0018488 A1 | 1/2006 | Viala et al. |
| 2006/0132455 A1 | 6/2006 | Rimas-Ribikauskas |
| 2006/0149337 A1 | 7/2006 | John |
| 2007/0012507 A1 | 1/2007 | Lyon |
| 2007/0142874 A1 | 6/2007 | John |
| 2008/0064955 A1 | 3/2008 | Miyajima |
| 2008/0223925 A1 | 9/2008 | Saito et al. |
| 2008/0260211 A1 | 10/2008 | Bennett et al. |
| 2009/0149722 A1 | 6/2009 | Abolfathi et al. |
| 2009/0228791 A1 | 9/2009 | Kim |
| 2009/0234262 A1 | 9/2009 | Reid, Jr. et al. |
| 2009/0287485 A1 | 11/2009 | Glebe |
| 2009/0289958 A1 | 11/2009 | Kim et al. |
| 2009/0309751 A1 | 12/2009 | Kano et al. |
| 2010/0016741 A1 | 1/2010 | Mix et al. |
| 2010/0066664 A1 | 3/2010 | Son et al. |
| 2010/0137107 A1 | 6/2010 | Jamsa et al. |
| 2010/0162177 A1 | 6/2010 | Eves et al. |
| 2010/0168572 A1 | 7/2010 | Sliwa et al. |
| 2010/0286571 A1 | 11/2010 | Allum et al. |
| 2010/0297944 A1 | 11/2010 | Lee |
| 2010/0315206 A1 | 12/2010 | Schenk et al. |
| 2010/0316235 A1 | 12/2010 | Park et al. |
| 2010/0328033 A1 | 12/2010 | Kamei |
| 2011/0022025 A1 | 1/2011 | Savoie et al. |
| 2011/0125063 A1 | 5/2011 | Shalon et al. |
| 2011/0134030 A1 | 6/2011 | Cho |
| 2011/0135106 A1 | 6/2011 | Yehuday et al. |
| 2011/0137649 A1 | 6/2011 | Rasmussen et al. |
| 2011/0152637 A1 | 6/2011 | Kateraas et al. |
| 2011/0155479 A1 | 6/2011 | Oda |
| 2011/0227856 A1 | 9/2011 | Corroy et al. |
| 2011/0245669 A1 | 10/2011 | Zhang |
| 2011/0255702 A1 | 10/2011 | Jensen |
| 2011/0260830 A1 | 10/2011 | Weising |
| 2011/0269601 A1 | 11/2011 | Nelson et al. |
| 2011/0276312 A1 | 11/2011 | Shalon |
| 2011/0282662 A1 | 11/2011 | Aonuma et al. |
| 2012/0010478 A1 | 1/2012 | Kinnunen et al. |
| 2012/0011990 A1 | 1/2012 | Mann |
| 2012/0058859 A1 | 3/2012 | Elsom-Cook et al. |
| 2012/0065477 A1 | 3/2012 | Enomoto |
| 2012/0065506 A1 | 3/2012 | Smith |
| 2012/0202479 A1 | 8/2012 | Sugitani et al. |
| 2012/0212441 A1 | 8/2012 | Christiansson et al. |
| 2012/0280900 A1 | 11/2012 | Wang et al. |
| 2012/0290832 A1 | 11/2012 | Antequera Rodriguez et al. |
| 2013/0034238 A1 | 2/2013 | Abolfathi |
| 2013/0041235 A1 | 2/2013 | Rogers et al. |
| 2013/0119133 A1 | 5/2013 | Michael et al. |
| 2013/0120458 A1 | 5/2013 | Celebisoy et al. |
| 2013/0135223 A1* | 5/2013 | Shai ............... G06F 3/014 345/173 |
| 2013/0142363 A1 | 6/2013 | Amento et al. |
| 2013/0171599 A1 | 7/2013 | Bleich et al. |
| 2013/0173926 A1 | 7/2013 | Morese et al. |
| 2013/0212648 A1 | 8/2013 | Tietjen et al. |
| 2013/0215060 A1* | 8/2013 | Nakamura ........ G06F 1/1626 345/173 |
| 2013/0225915 A1 | 8/2013 | Redfield et al. |
| 2013/0225940 A1 | 8/2013 | Fujita et al. |
| 2013/0278396 A1 | 10/2013 | Kimmel |
| 2013/0288655 A1 | 10/2013 | Foruntanpour et al. |
| 2013/0346620 A1 | 12/2013 | Gizis et al. |
| 2014/0009262 A1 | 1/2014 | Robertson et al. |
| 2014/0028604 A1 | 1/2014 | Morinaga et al. |
| 2014/0035884 A1 | 2/2014 | Oh et al. |
| 2014/0097608 A1 | 4/2014 | Buzhardt et al. |
| 2014/0099991 A1 | 4/2014 | Cheng et al. |
| 2014/0107531 A1 | 4/2014 | Baldwin |

(56) References Cited

U.S. PATENT DOCUMENTS

| | | | |
|---|---|---|---|
| 2014/0168093 A1 | 6/2014 | Lawrence | |
| 2014/0168135 A1 | 6/2014 | Saukko et al. | |
| 2014/0174174 A1 | 6/2014 | Uehara et al. | |
| 2014/0188561 A1 | 7/2014 | Tenbrock et al. | |
| 2014/0210791 A1 | 7/2014 | Hanauer et al. | |
| 2014/0240124 A1 | 8/2014 | Bychkov | |
| 2015/0084011 A1 | 3/2015 | Park et al. | |
| 2015/0092962 A1 | 4/2015 | Amento et al. | |
| 2015/0120465 A1 | 4/2015 | Baldwin et al. | |
| 2015/0128094 A1 | 5/2015 | Baldwin et al. | |
| 2015/0137936 A1 | 5/2015 | Baldwin et al. | |
| 2015/0137960 A1 | 5/2015 | Baldwin et al. | |
| 2015/0138062 A1 | 5/2015 | Baldwin et al. | |
| 2015/0150116 A1 | 5/2015 | Baldwin et al. | |
| 2015/0199950 A1* | 7/2015 | Heiman | G10K 11/002 381/71.1 |

FOREIGN PATENT DOCUMENTS

| | | |
|---|---|---|
| CA | 1207883 | 7/1986 |
| EP | 0712114 | 5/1996 |
| EP | 0921753 | 6/1999 |
| EP | 1436804 | 2/2004 |
| EP | 2312997 | 4/2011 |
| EP | 2643981 | 5/2012 |
| EP | 2483677 | 8/2012 |
| GB | 2226931 | 7/1990 |
| GB | 2348086 | 9/2000 |
| JP | 02249017 | 10/1990 |
| JP | 04-317638 A | 11/1992 |
| JP | 2003058190 | 2/2003 |
| JP | 2005142729 | 6/2005 |
| JP | 2010210730 | 9/2010 |
| KR | 20100056688 | 10/1990 |
| TW | 200946887 | 8/1997 |
| WO | WO 8201329 | 4/1982 |
| WO | WO 9601585 | 1/1996 |
| WO | WO 03033882 | 4/2003 |
| WO | WO 2006094372 | 9/2006 |
| WO | WO 2009001881 | 12/2008 |
| WO | WO 2010045158 | 4/2010 |
| WO | WO 2012168534 | 12/2012 |

OTHER PUBLICATIONS

U.S. Office Action dated Aug. 25, 2015 in U.S. Appl. No. 14/083,094.
U.S. Office Action dated Jun. 25, 2015 in U.S. Appl. No. 14/083,110.
U.S. Appl. No. 14/482,087, filed Sep. 10, 2014.
U.S. Appl. No. 14/482,101, filed Sep. 10, 2014.
U.S. Appl. No. 14/482,078, filed Sep. 10, 2014.
U.S. Appl. No. 14/482,658, filed Oct. 15, 2014.
U.S. Office Action dated Mar. 8, 2010 in U.S. Appl. No. 11/586,142.
U.S. Office Action dated Aug. 12, 2010 in U.S. Appl. No. 11/586,142.
Examiner's Answer to Appeal Brief dated Apr. 22, 2011 in U.S. Appl. No. 11/586,142.
Patent Board Decision on Appeal dated Sep. 25, 2014 in U.S. Appl. No. 11/586,142.
Notice of Allowance dated Dec. 18, 2014 in U.S. Appl. No. 11/586,142.
Harrison et al., "Acoustic Barcodes: Passive, Durable and Inexpensive Notched Identification Tags," Proceedings of the 25th Annual ACM Symposium on User Interface Software and Technology, Oct. 7-10, 2012, ACM, Cambridge, MA.
Yoo et al., "Analysis of Body Sensor Network Using Human Body as the Channel," Proceedings of the ICST 3rd International Conference on Body Area Networks, 2008, Institute for Computer Sciences, Social-Informatics and Telecommunications Engineering.
Harrison et al., "Skinput: Appropriating the Body as an Input Surface," Proceedings of the SIGCHI Conference on Human Factors in Computing Systems, Apr. 10-15, 2010, ACM, Atlanta, GA.
Mujibiya et al., "The Sound of Touch: On-body Touch and Gesture Sensing Based on Transdermal Ultrasound Propagation," Proceedings of the 2013 ACM International Conference on Interactive Tabletops and Surfaces, Oct. 6-9, 2013, ACM, St. Andrews, United Kingdom.
Ni et al., "Disappearing Mobile Devices," Proceedings of the 22nd Annual ACM Symposium on User Interface Software and Technology, Oct. 4-7, 2009, ACM, Victoria, British Columbia, Canada.
Zhong et al., "OsteoConduct: Wireless Body-Area Communication based on Bone Conduction," Proceeding of the ICST 2nd International Conference on Body Area Networks, BodyNets 2007.
Travis et al., "Hambone: A bio-acoustic gesture interface," 2007 11th IEEE International Symposium on Wearable Computers, 2007.
Scanlon, Michael V. Acoustic sensor for health status monitoring. Army Research Lab Aberdeen Proving Ground MD, 1998.
Yamada, Guillaume Lopez; Masaki Shuzo; Ichiro. "New healthcare society supported by wearable sensors and information mapping-based services." International Journal of Networking and Virtual Organisations 9.3 (2011): 233-247.
Scanlon, Michael V. "Acoustic sensors in the helmet detect voice and physiology." AeroSense 2003. International Society for Optics and Photonics, 2003.
Amento et al., "The Sound of One Hand: A Wrist-Mounted Bio-Acoustic Fingertip Gesture Interface," Short Talk: It's All About Sound, CHI 2002.
"Kinect Gestures," retrieved from http://support.xbox.com/en-US/xbox-360/kinect/body-controller on Oct. 24, 2013.
Mark Billinghurst, "Chapter 14: Gesture Based Interaction," Haptic Input, Aug. 24, 2011.
Kompis, Martin, and Rudolf Haeusler, "Electromagnetic interference of bone-anchored hearing aids by cellular phones revisited," Acta oto-laryngologica 122.5, 2002, 510-512.
T. Scott Saponas, et al., "Enabling always-available input with muscle-computer interfaces," Proceedings of the 22nd Annual ACM Symposium on User Interface Software and Technology, ACM, 2009.
Jao Henrique Donker, "The Body as a communication medium," 2009.
Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.
Vidya Bharrgavi, et al., "Security Solution for Data Integrity in Wireless BioSensor Networks," Distributed Computing Systems Workshops, 2007, ICDCSW'07, 27th International Conference, IEEE, 2007.
Daniel Halperin, et al., "Pacemakers and Implantable Cardiac Defibrillators: Software Radio Attacks and Zero-Power Defenses," Security and Privacy, SP 2008, IEEE Symposium, IEEE, 2008.
Carmen C. Y. Poon, et al., "A Novel Biometrics Method to Secure Wireless Body Area Sensor Networks for Telemedicine and M-Health," Communications Magazine, IEEE 44.4, 2006, 73-81.
Zicheng Liu, et al., "Direct Filtering for Air-and Bone-Conductive Microphones," Multimedia Signal Processing, 2004 IEEE 6th Workshop, IEEE, 2004.
Hinckley, Ken, and Hyunyoung Song, "Sensor synaesthesia: touch in motion, and motion in touch." Proceedings of the SIGCHI Conference on Human Factors in Computing Systems. ACM, 2011.
Hinge, Dhanashree, and S. D. Sawarkar. "Mobile to Mobile data transfer through Human Area Network." IJRCCT 2.11 (2013): 1181-1184.
Park, Duck Gun, et al. "TAP: touch-and-play." Proceedings of the SIGCHI conference on Human Factors in computing systems. ACM, 2006.
Ruiz, J. Agud, and Shigeru Shimamoto. "A study on the transmission characteristics of the human body towards broadband intra-body communications." Consumer Electronics, 2005.(ISCE 2005). Proceedings of the Ninth International Symposium on. IEEE, 2005.
Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.

(56) References Cited

OTHER PUBLICATIONS

Lipkova, Jolana, and Jaroslav Cechak. "Transmission of Information Using the Human Body."

Maruf, Md Hasan. "An Input Amplifier for Body-Channel Communication." (2013).

Rekimoto, Jun. "Gesturewrist and gesturepad: Unobtrusive wearable interaction devices." Wearable Computers, 2001. Proceedings. Fifth International Symposium on. IEEE, 2001.

U.S. Office Action dated Feb. 13, 2013 in U.S. Appl. No. 13/309,124.

U.S. Office Action dated Sep. 24, 2013 in U.S. Appl. No. 13/309,124.

U.S. Office Action dated Jan. 29, 2014 in U.S. Appl. No. 13/309,124.

U.S. Office Action dated Dec. 17, 2015 in U.S. Appl. No. 14/065,663.

U.S. Office Action dated Nov. 19, 2015 in U.S. Appl. No. 14/083,499.

U.S. Office Action dated Nov. 19, 2015 in U.S. Appl. No. 14/090,668.

U.S. Office Action dated Jan. 11, 2016 in U.S. Appl. No. 14/514,658.

U.S. Office Action dated Feb. 25, 2016 in U.S. Appl. No. 14/072,126.

U.S. Notice of Allowance dated Apr. 4, 2016 in U.S. Appl. No. 14/083,499.

U.S. Notice of Allowance dated Mar. 21, 2016 in U.S. Appl. No. 14/090,668.

U.S. Office Action dated Mar. 16, 2016 in U.S. Appl. No. 14/482,087.

U.S. Office Action dated Jul. 7, 2016 in U.S. Appl. No. 14/072,126.

U.S. Office Action dated Sep. 14, 2016 in U.S. Appl. No. 14/482,101.

U.S. Office Action dated Aug. 17, 2016 in U.S. Appl. No. 15/161,499.

U.S. Notice of Allowance dated Oct. 7, 2016 in U.S. Appl. No. 15/224,808.

* cited by examiner

DEVICE HOLD DETERMINATION USING BONE CONDUCTION

BACKGROUND

Today, smartphones and other mobile devices, such as handheld video game systems and tablets, utilize advanced sensors to provide feedback to a user and/or to one or more applications that are executing on the device. For example, some devices include sensors such as accelerometers to detect motion and/or sensors such as gyroscopes to detect orientation. Data output by these sensors can be utilized to change an operation of the device, such as to wake the device from sleep or launch an application.

SUMMARY

Concepts and technologies are disclosed herein for device hold determination using bone conduction. According to one aspect, a device side transducer of a user device can receive a bone conduction signal from a user side transducer. The bone conduction signal can propagate through one or more bones of a user, such as one or more finger bones. An application can be executed by a processor of the user device to analyze the bone conduction signal to determine how the device is being held.

In some embodiments, data regarding how the user device is being held by the user can be exposed to an application that is executable by the processor of the user device, an application external to the user device, an operating system that is executable by the user device, and/or a website.

In some embodiments, the device side transducer of the user device is built-in to the user device. In some embodiments, the device side transducer of the user device is attached to the user device. In some embodiments, the device side transducer is built-in to a case or other component of the user device, such as a display of the user device.

In some embodiments, the user side transducer is built-in to a device worn by the user. For example, the user side transducer might be built-in to a smart watch or other wearable device. In some embodiments, the user side transducer is attached to a device worn by the user. In some embodiments, the user side transducer is attached to or worn directly by the user or is disposed underneath the skin or within the body of the user.

In some embodiments, the user device triggers the user side transducer to send the bone conduction signal. For example, the user device can send a signal trigger to the user side transducer via a connection established between the user device and the user side transducer. The connection may be wireless or wired.

In some embodiments, the user device can receive a reference signal. In these embodiments, the analysis performed by the application to determine how the device is being held can include a comparison of the bone conduction signal to the reference signal to associate the bone conduction signal with at least a portion of a hand of the user to determine how the user device is being held in the hand of the user. In some embodiments, the user device can receive, via a further device side transducer, a further bone conduction signal from the user side transducer. The further bone conduction signal can be propagated through a further bone of the user. The analysis performed by the application to determine how the user device is being held in the hand of the user can be further based upon a comparison of the further bone conduction signal to the reference signal to associate the further bone conduction signal with at least a further portion of the hand of the user to determine how the user device is being held in the hand of the user.

In some embodiments, the user device can receive output from one or more sensors. In these embodiments, the analysis performed by the application to determine how the user device is being held by the user can further consider the output from the sensor(s).

According to another aspect, a processor of a user device that is executing an application can cause presentation of a user interface associated with the application on a display of the user device. The user device can receive, via the application, data regarding how the user device is being held by the user. The processor of the user device also can cause the user interface of the application to be modified to accommodate how the user device is being held by the user. The processor of the user device also can cause presentation of the user interface, on the display, as modified to accommodate how the user device is being held by the user.

In some embodiments, the user device also can receive, via the application, input via the user interface as modified to accommodate how the user device is being held by the user. In these embodiments, the user device can perform one or more operations in response to the input.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
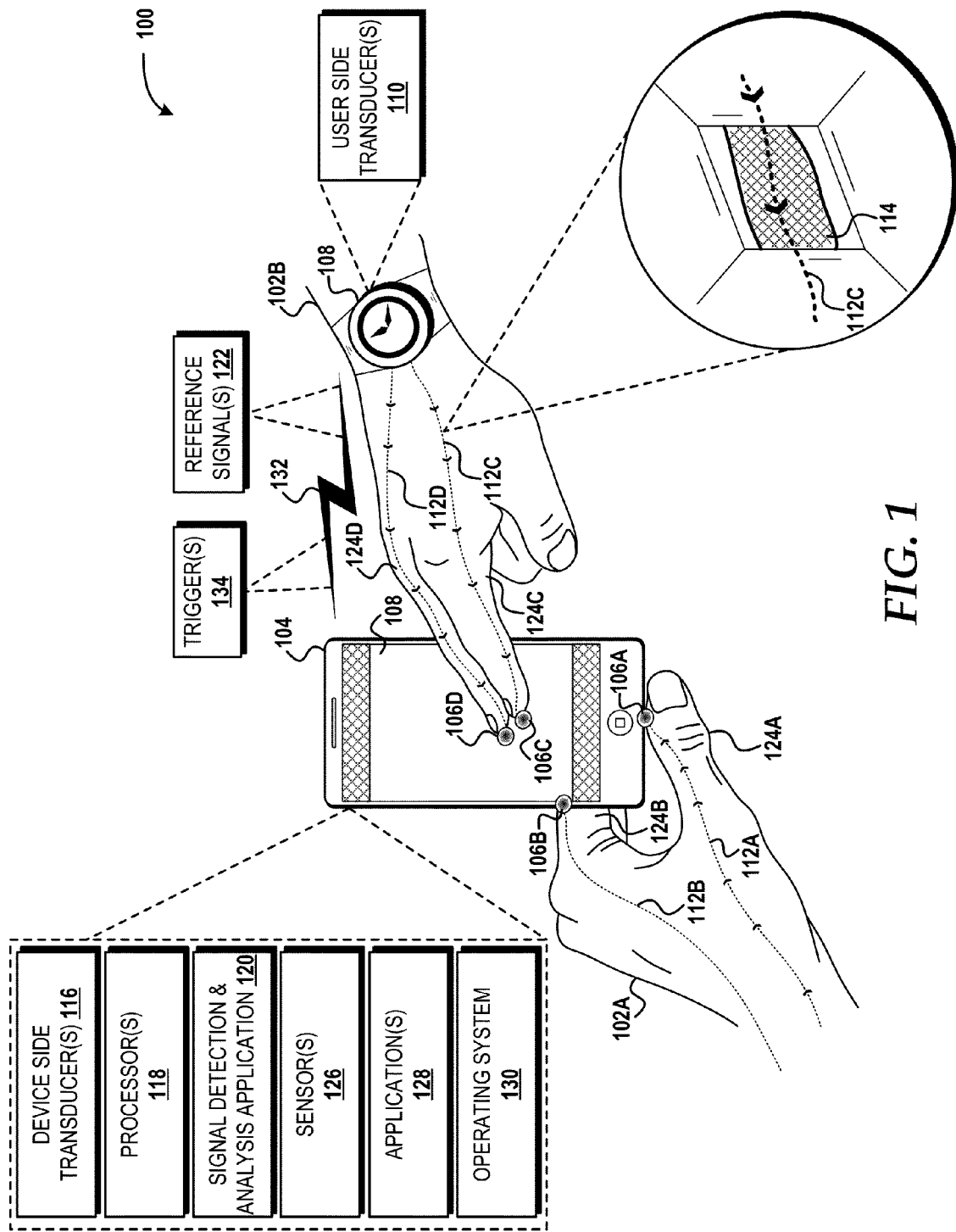
FIG. 1 is a diagram illustrating aspects of an illustrative operating environment for various concepts disclosed herein, according to an illustrative embodiment.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of determining how a user is holding a device using bone conduction will be presented.

Referring now to FIG. 1, aspects of an operating environment 100 in which various embodiments presented herein may be implemented will be described, according to an illustrative embodiment. The illustrated operating environment 100 includes a user's first hand 102A and a user's second hand 102B (referred to herein collectively as "user's hands 102") that are holding a user device 104. In particular, the user's first hand 102A is in contact with the user device 104 at a first contact point 106A on the bottom side of the user device 104 and at a second contact point 106B on the lower left side of the user device 104, and the user's second hand 102B is in contact with a display 108 of the user device 104 at a third contact point 106C and a fourth contact point 106D.

The user device 104, in some embodiments, is or includes a desktop, laptop computer, a notebook computer, a tablet computer, a netbook computer, a mobile telephone, a smartphone, a feature phone, a video game system, a handheld video game system, a set-top box, a vehicle computing system, a smart watch, a personal fitness tracker, a safety device, a wearable device, a music playback device, a video playback device, an internet appliance, a television, a personal digital assistant ("PDA"), combinations thereof, or the like. It should be understood that the functionality of the user device 104 can be provided by a single device, by two or more similar devices, and/or by two or more dissimilar devices.

In the illustrated embodiment, the user is wearing a watch 108 on the second hand 102B. The watch 108 includes one or more user side transducers 110. The user side transducer(s) 110, in some embodiments, are piezoelectric transducers, such as contact microphones or other electro-acoustic transducers. The user side transducer(s) 110 can generate vibrations in accordance with one or more signals (hereinafter "vibration signals 112A-112D"). The vibration signals 112A-112D can propagate through the user's body, and more particularly, through one or more bones 114 of the user's body, to the user device 104 via bone conduction.

The user side transducer(s) 110 can be built-in to the watch 108. The user side transducer(s) 110 can be attached to the watch 108. The user side transducer(s) 110 can be built-in to another device that is attached to or worn by the user. The user side transducer(s) 110 can be attached to another device that is attached to or worn by the user. The user side transducer(s) 110 can be attached to or worn directly on the skin (e.g., as a tattoo or part of a tattoo), underneath the skin, or within the body of the user (e.g., as an implantation device). As such, the user side transducer(s) 110 being built-in to the watch 108 in the illustrated embodiment should not be construed as being limiting in any way.

The user device 104 can receive the vibration signals 112A-112D via one or more device side transducers 116. The device side transducer(s) 116, in some embodiments, are piezoelectric transducers, such as contact microphones or other electro-acoustic transducers. The device side transducer(s) 116 can be built-in to the user device 104. The device side transducer(s) 116 can be attached to the user device 104. The device side transducer(s) 116 can be built-in to a case that is placed on the user device 104. The device side transducer(s) 116 can be built-in to the display 108 of the user device 104 and/or any other component of the user device 104. As such, the device side transducer(s) 116 being built-in to the user device 104 in the illustrated embodiment should not be construed as being limiting in any way.

The user device 104 can execute, via one or more processors 118, a signal detection and analysis application 120 to detect the vibration signals 112A-112D received by the device side transducer(s) 116 and to analyze the vibration signals 112A-112D to determine how the user is holding the user device 104. How the user is holding the user device 104 can be defined, at least in part, by data associated with one or more contact points, such as, for example, the contact points 106A-106D in the illustrated embodiment. The data associated with one or more contact points can include, but is not limited to, one or more unique effects of a portion of the user's body on one or more reference signals 122. The reference signal(s) 122 can include the vibration signals 112A-112D prior to the vibration signals 112A-112D propagating through the bone(s) 114 of the user's body.

One or more signal characteristics (e.g., amplitude, frequency, and/or phase) of the vibration signals 112A-112D can be modified during propagation through the user's body by, for example, the height, weight, body fat percentage, body muscle percentage, and/or bone characteristics such as bone density, bone structure, and bone mass of the user's body. More particularly, in the illustrated example, the vibration signal 112A is shown propagating through a first finger 124A on the first hand 102A of the user to the user device 104 at the first contact point 106A; the vibration signal 112B is shown propagating through a second finger 124B of the first hand 102A of the user to the user device 104 at the second contact point 106B; the vibration signal 112C is shown propagating through a third finger 124C of the second hand 102B of the user to the user device 104 at the third contact point 106C; and the vibration signal 112D is shown propagating through a fourth finger 124D of the second hand 102B of the user to the user device 104 at the fourth contact point 106D. The first finger 124A, the second finger 124B, the third finger 124C, and the fourth finger 124D may be referred to herein collectively as "fingers 124." Due to variations in the size, structure, density, and/or bone mass of the fingers 124, the vibration signals 112, during propagation through at least the fingers 124, can be modified so as to distinguish the fingers 124 and the associated contact points 106A-106D In addition to data associated with the contact points 106A-106D, data output by one or more sensors 126 of the user device 104 can be used by the signal detection and analysis application 120 to determine how the user is holding the user device 104. The sensor(s) 126 can include, but are not limited to, accelerometers, gyroscopes, magnetometers, and/or other sensors, the output of which can be used, at least in part, to determine how the user is holding the user device 104, and more particularly, with regard to an orientation and/or movement of the user device 104, for example. The sensor(s) 126 also can include other sensors such as, but not limited to, temperature sensors, light sensors, air quality sensors, other movement sensors, other orientation sensors, noise sensors, proximity sensors, infrared sensors, noise sensors, microphones, combinations thereof, and/or the like.

The data regarding how the user is holding the user device 104 can be provided by the signal detection and analysis application 120 to one or more applications 128 and/or to an operating system 130. The application(s) 128 can include, but are not limited to, productivity applications, entertainment applications, video applications, music applications, video game applications, camera applications, messaging applications, social network applications, enterprise applications, map applications, security applications, presence applications, visual voice mail applications, text-to-speech applications, speech-to-text applications, email applications, calendar applications, camera applications, web browser applications, and the like. The application(s) 128 can execute on top of an operating system 130. The operating system 130 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way. The signal detection and analysis application 120 can be a standalone application or can be included as part of the application(s) 128 or the operating system 130. In some embodiments, operations available from the signal detection and analysis application 120 can be exposed via one or more application programming interfaces ("APIs") (not shown).

In the illustrated embodiment, the user device 104 can communicate with the watch 108 via a wireless connection 132. Establishment of the wireless connection 132 can be initiated by the user device 104 or the watch 108. The wireless connection 132 can be created using BLUETOOTH, BLUETOOTH LOW ENERGY, near-field communications ("NFC"), ad-hoc WI-FI, WI-FI, ZIGBEE, other radio frequency technologies, infrared, infrared data association ("IRDA"), combinations thereof, and the like. Although the wireless connection 132 is shown, a wired connection can be established between the user device 104 and the watch 108. Moreover, multiple wireless and/or wired connections can be utilized between the user device 104 and the watch 108 and/or one or more other devices that each include, for example, one or more of the user side transducer(s) 110. As such, the configuration shown in this regard should not be construed as being limiting in any way.

The user device 104, and more particularly, the signal detection and analysis application 120, can generate one or more triggers 134. The trigger(s) 134 can be generated in response to an output of one or more sensors, such as touch sensors, gyroscopes, accelerometers, or the like, that is indicative of a user holding the user device 104. The trigger(s) 134 can be generated in response to an input entered by a user. The trigger(s) 134 can be generated in response to an instruction received by the signal detection and analysis application 120 from one or more of the applications 128. The trigger(s) 134 can be utilized by the watch 108 to instruct the user side transducer(s) 110 to send the reference signal(s) 122 and/or the vibration signals 112A-112D to the user device 104. The trigger(s) 134 can be bone conduction or simple capacitance detection. For example, when the user picks up the user device 104, the user side transducer(s) 110 can detect the capacitive field around the user's body. After the user device 104 detects the capacitive field, the user device 104 can trigger one or more operations to determine how the user device 104 is being held.

Figure 2:
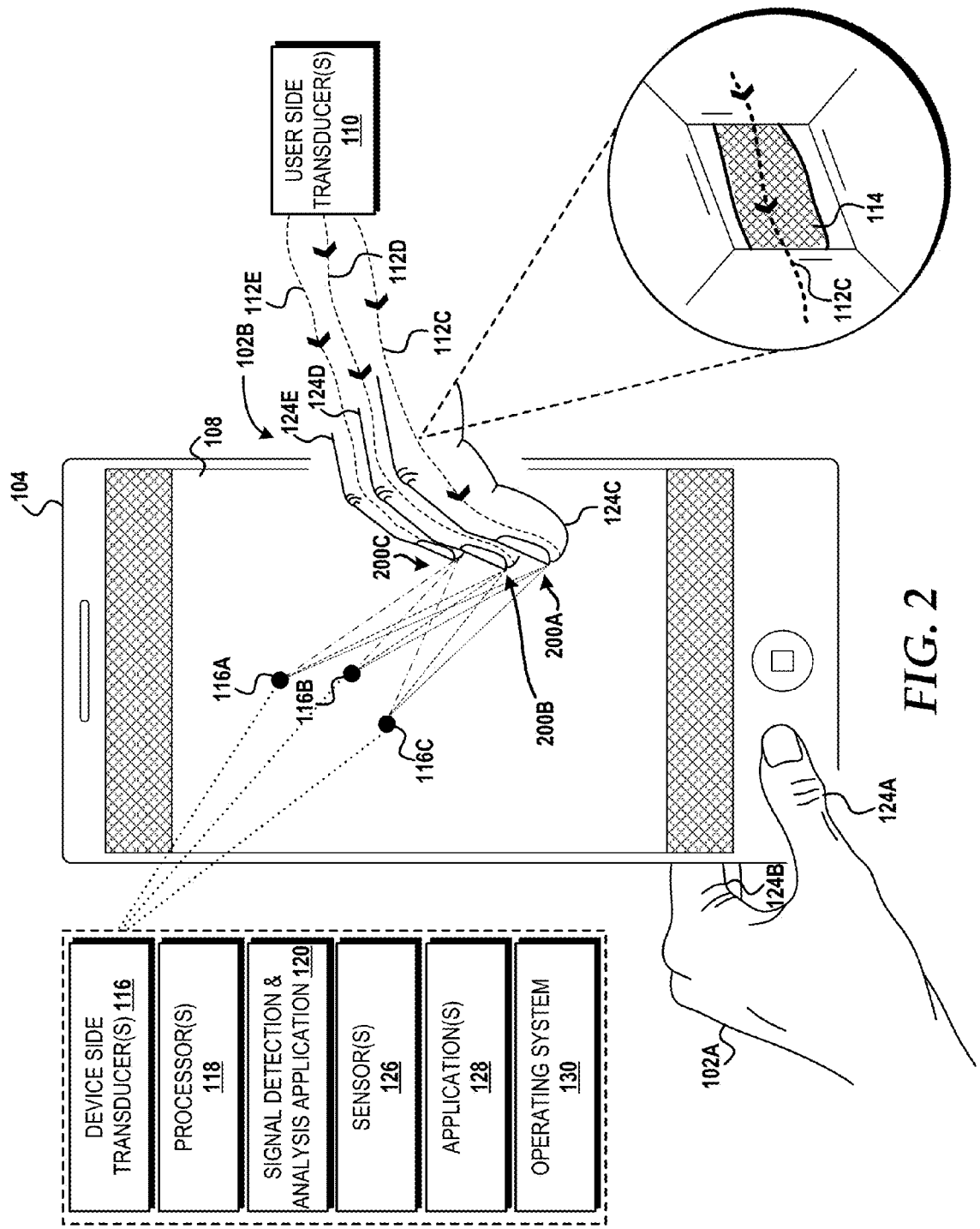
FIG. 2 is a diagram illustrating a user device, a plurality of device side transducers, and a plurality of signals, according to an illustrative embodiment.

Turning now to FIG. 2, the user device 104, the display 108, the user side transducer(s) 110, and the device side transducer(s) 116 introduced in FIG. 1 are again shown. In the illustrated example, the user is in contact with the display 108 of the user device 104 using the third finger 124C, the fourth finger 124D, and a fifth finger 124E on the user's second hand 102B. The user side transducer(s) 110, as shown in the illustrated example, are transmitting the vibration signal 112C through the third finger 124C, the vibration signal 112D through the fourth finger 124D, and the vibration signal 112E through the fifth finger 124E. The device side transducer(s) 116, and particularly a first device side transducer 116A, a second device side transducer 116B, and a third device side transducer 116C, are shown receiving propagated signals 200A-200C, which have been sent through the user's body, and more particularly, through one or more bones 114 of the user's body.

Each of the device side transducers 116A-116C can receive the propagated signals 200A-200C, but due to the location of each of the device side transducers 116A-116C, the signal characteristics of the propagated signals 200A-200C as received will vary for each of the device side transducers 116A-116C. In the illustrated example, each of the propagated signals 200A-200C is shown with three signal contributions corresponding to the device side transducers 116A-116C, respectively. It should be understood, however, that a different number of signal contributions can be received proportionate to the number of device side transducers utilized in a given application, although other implementations may utilize greater or fewer signal contributions. Also, in the illustrated example the device side transducers 116A-116C are embedded in the user device 104, such as in a casing (not shown) of the user device 104.

The device side transducers 116A-116C receive the propagated signals 200A-200C and transmit the propagated signals 200A-200C to the signal detection and analysis application 120. The signal detection and analysis application 120 can isolate the signal contributions from each of the fingers 124 received at each of the device side transducers 116A-116C. By comparing the time differences for each unique signal contribution between the device side transducers 116A-116C, the signal detection and analysis application 120 can determine the relative location of each of the sources (i.e., each of the fingers 124). By comparing the unique signal contributions to the reference signal(s) 122 (best shown in FIG. 1) and, in some embodiments, using reference information describing the impacts each finger has on a transmitted signal, the signal detection and analysis application 120 can associate each source with a specific one of the fingers 124. The reference information, for example, can be gathered during a training process in which signals from each finger are captured and stored in association with the corresponding finger. The signal detection and analysis application 120 can then make this information available to the application(s) 128, the operating system 130, one or more websites (not shown), and/or other systems, devices, and/or applications. An application may alter a user interface based on how the user is holding the user device 104. It is contemplated that an application might associate different controls or more diverse controls with different fingers and gestures. Which finger or fingers are used might be accomplished at least in part by a process of elimination based on how the user device 104 is being held.

The quantity and arrangement/configuration of the device side transducers 116 may vary with device cost as well as the general design and construction of the user device 104. While three device side transducers 116 should be sufficient, additional device side transducers 116 may be used to simplify analysis and/or to increase accuracy. As such, the illustrated example should not be construed as being limiting in any way.

Figure 3:
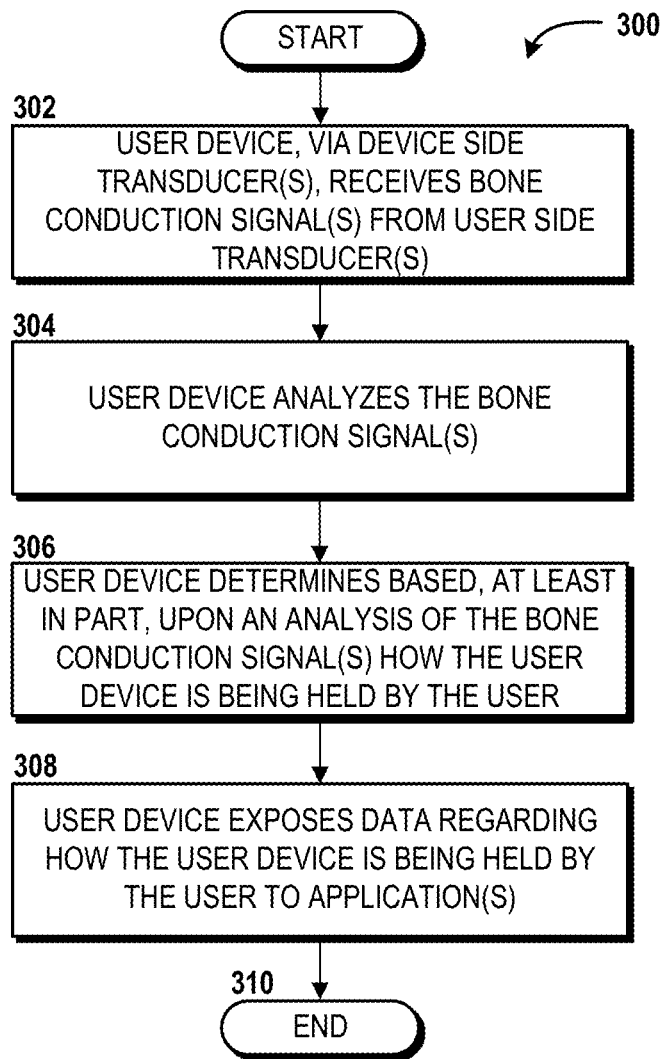
FIG. 3 is a flow diagram illustrating aspects of a method for determining how a user device is being held by a user using bone conduction, according to another illustrative embodiment.

Turning now to FIG. 3, aspects of a method 300 for determining how the user device 104 is being held by a user using bone conduction will be described, according to an illustrative embodiment. It should be understood that the operations of the methods are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the user device 104, the watch, 108, single-processor or multiprocessor systems, minicomputers, mainframe computers, personal computers, hand-held computing devices, microprocessor-based, programmable consumer electronics, other devices and systems disclosed herein, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing one or more processors, such as the processor(s) 118 of a computing system or device, such as the user device 104, another device disclosed herein, or another system disclosed herein, to perform one or more operations and/or causing the processor to direct other components of the computing system or device to perform one or more of the operations.

For purposes of illustrating and describing some of the concepts of the present disclosure, the methods disclosed herein are described as being performed, at least in part, by the user device 104 via execution, by the processor(s) 118, of one or more software modules and/or software applications, such as, for example, the signal detection and analysis application 120, the application(s) 128, and/or the operating system 130. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 3 and further reference to FIGS. 1 and 2. The method 300 begins at operation 302, where the user device 104, via the device side transducer(s) 116, receives one or more bone conduction signals, such as the propagated signals 200A-200C (best shown in FIG. 2), from the user side transducer(s) 110. From operation 302, the method 300 proceeds to operation 304, where the user device 104 analyzes the bone conduction signal(s). In some embodiments, an analysis at operation 304 can include a comparison of the bone conduction signal(s) to one or more reference signals, such as the reference signal(s) 122 (best shown in FIG. 1).

From operation 304, the method 300 proceeds to operation 306, where the user device 104 determines based, at least in part, upon the analysis performed at operation 304, how the user device 104 is being held by the user. For example, the signal detection and analysis application 120 can isolate the signal contributions from each of the fingers 124 received at each of the device side transducers 116. By comparing the time differences for each unique signal contribution between the device side transducers 116, the signal detection and analysis application 120 can determine the relative location of each of the sources (i.e., each of the fingers 124). By comparing the unique signal contributions to the reference signal(s) 122 (best shown in FIG. 1) and, in some embodiments, using reference information describing the impacts each finger has on a transmitted signal, the signal detection and analysis application 120 can associate each source with a specific one of the fingers 124, which can then be used to describe how the user device 104 is being held by the user. From operation 306, the method 300 proceeds to operation 308, where the signal detection and analysis application 120 can then expose the data regarding how the user device 104 is being held by the user to the application(s) 128, the operating system 130, one or more websites (not shown), and/or other systems, devices, and/or other applications.

From operation 308, the method 300 proceeds to operation 310. The method 300 ends at operation 310.

Figure 4:
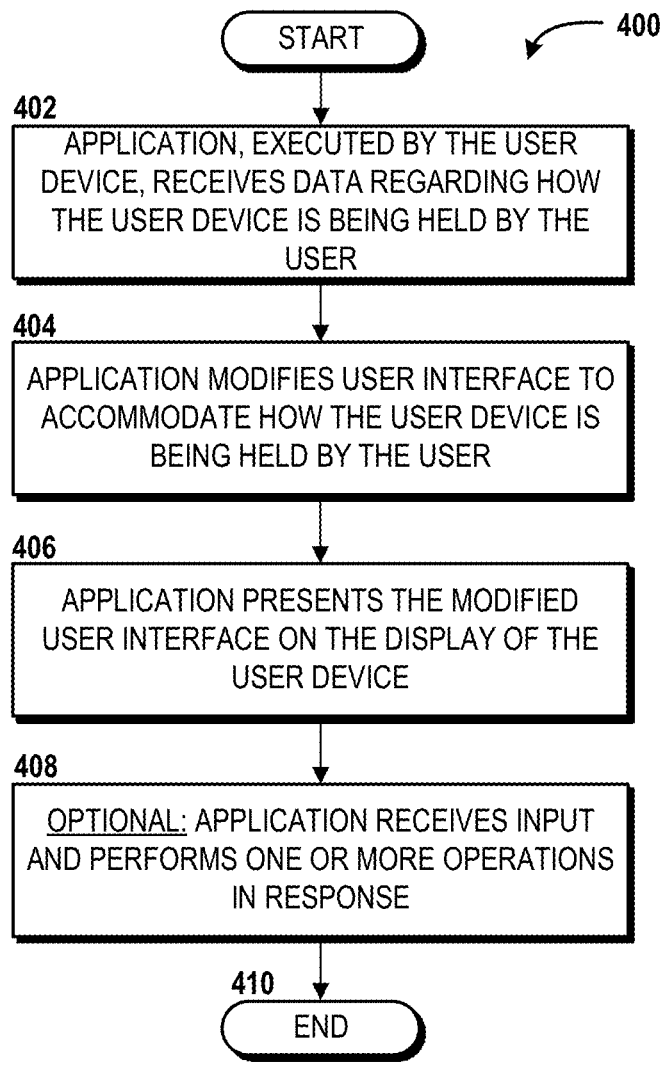
FIG. 4 is a flow diagram illustrating aspects of a method for modifying a user interface based upon how a user device is being held as determined using bone conduction, according to an illustrative embodiment.

Turning now to FIG. 4, aspects of a method 400 for modifying a user interface based upon how the user device 104 is being held by a user as determined using bone conduction will be described in detail, according to an illustrative embodiment. The method 400 will be described with reference to FIG. 4 and further reference to FIGS. 1, 2, and 5. The method 400 begins at operation 402, where an application, such as one of the application(s) 128 or the operating system 130, executed by the user device 104, receives data regarding how the user device 104 is being held by the user. In some embodiments, the data regarding how the user device 104 is generated in accordance with the method 300 described above.

Figure 5:
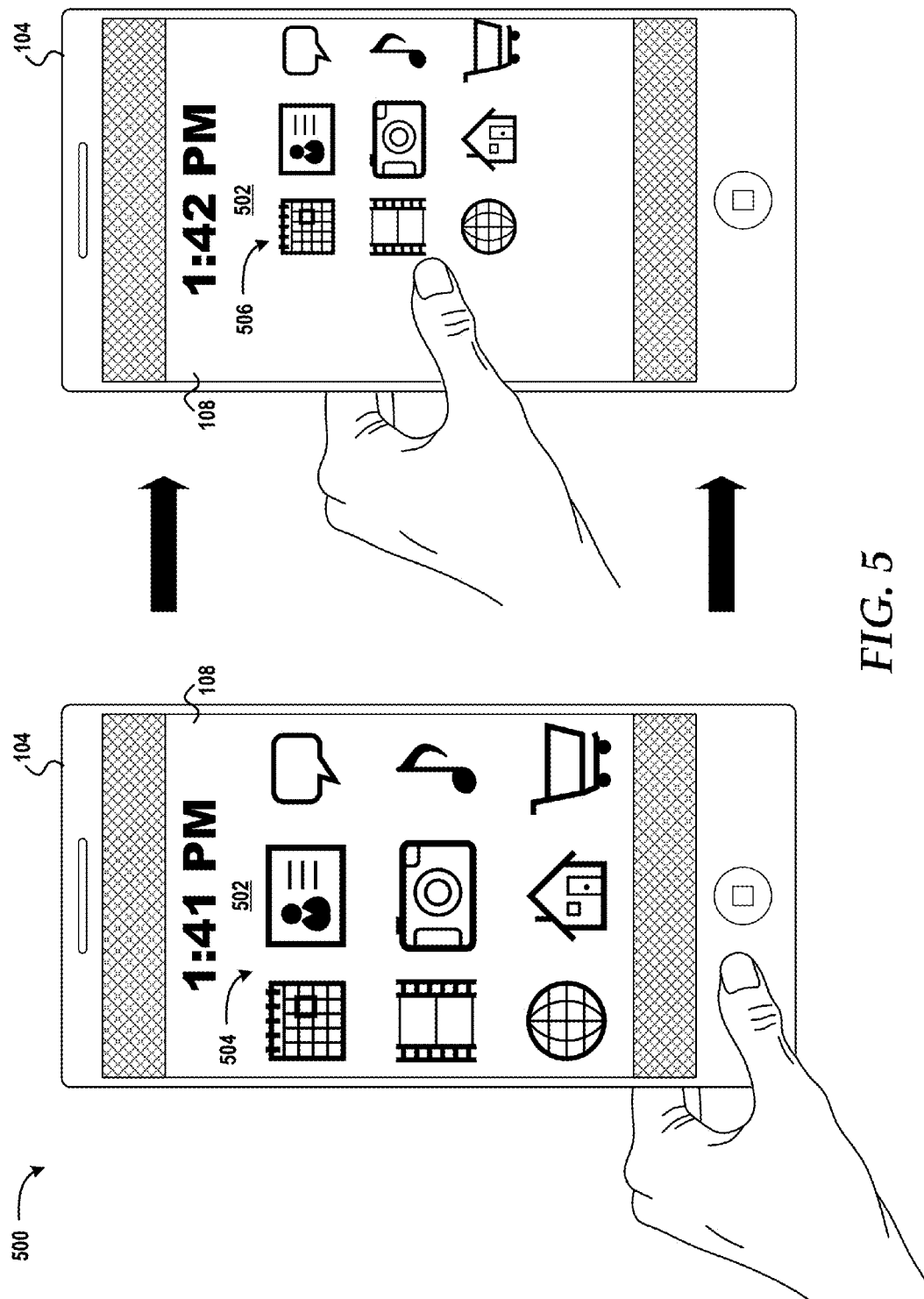
FIG. 5 is a user interface diagram illustrating aspects of a user interface that is modified based upon how a user device is being as determined using bone conduction, according to an illustrative embodiment.

From operation 402, the method 400 proceeds to operation 404, where the application modifies a user interface to accommodate how the user device 104 is being held by the user. Turning briefly to FIG. 5, a user interface diagram 500 illustrating aspects of a user interface 502 that is modified based upon how the user device 104 is being held as determined using bone conduction will be described, according to an illustrative embodiment, as but one example of how the application can modify a user interface to accommodate how the user device 104 is being held by the user. In the example illustrated in FIG. 5, a first configuration 504 of the user interface 504 is shown when the user is in contact with a casing of the user device 104 but not the display 108 of the user device 104, and a second configuration 506 is shown when the user is in contact with the display 108 of the user device 104. In the first configuration 504, a plurality of icons are shown on the display 108, and in the second configuration 506, the plurality of icons are again shown but are displayed in decreased size in response to the user holding a portion of the display 108 that, in the first configuration 504, would impede the user's view of the plurality of icons. It should be understood that this example is but one example of how a user interface can be modified in response to how a user is holding the user device 104, and as such, this example should not be construed as being limiting in any way.

From operation 404, the method 400 proceeds to operation 406, where the application presents the modified user interface, such as the second configuration 506 of the user interface 502 shown in FIG. 5, on the display 108 of the user device 104. From operation 406, the method 400 proceeds to optional operation 408, where the application receives input and performs one or more operations in response to the input. In the example shown in FIG. 5, the application that generates the user interface 502 (e.g., the operating system 130) can receive selection of one of the plurality of icons and the associated application, which may be one of the applications 128, is then launched.

From operation 408, the method 400 proceeds to operation 410. The method 400 ends at operation 410.

Figure 6:
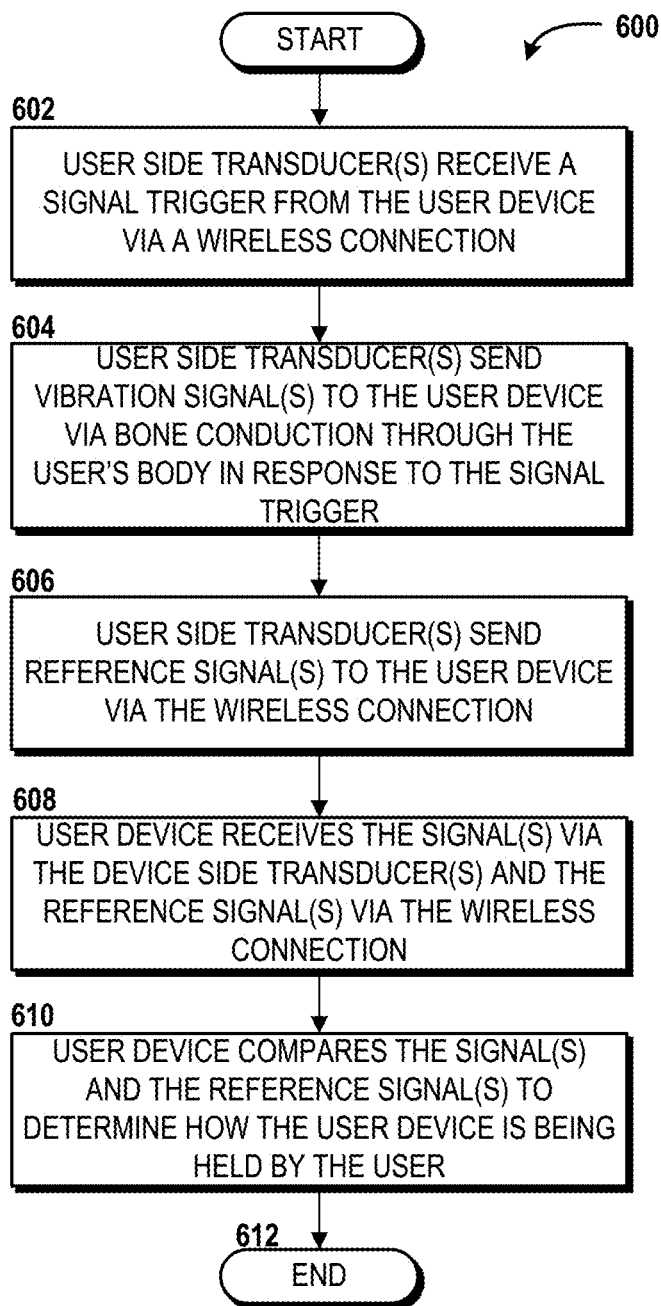
FIG. 6 is a flow diagram illustrating aspects of a method for comparing one or more bone conduction signals to one or more reference signals to determine how a user device is being held by a user, according to another illustrative embodiment.

Turning now to FIG. 6, aspects of a method 600 for comparing one or more bone conduction signals to one or more reference signals 122 to determine how the user device 104 is being held by a user will be described in detail, according to an illustrative embodiment. The method 600 will be described with reference to FIG. 6 and further reference to FIGS. 1 and 2. The method 600 begins at operation 602, where the user side transducer(s) 110 receive a signal trigger, such as the trigger 134 (best shown in FIG. 1), from the user device 104 via a wireless connection, such as the wireless connection 132 (also best shown in FIG. 1).

From operation 602, the method 600 proceeds to operation 604, where the user side transducer(s) 110 send one or more vibrations signals, such as the vibration signals 112A-112D, to the user device 104 via bone conduction through the user's body, and more particularly, through one or more bones 114 of the user's body in response to the trigger 134 received at operation 602.

From operation 604, the method 600 proceeds to operation 606, where the user side transducer(s) 110 send one or more reference signals, such as the reference signal(s) 122, to the user device 104 via the wireless connection 132. From operation 606, the method 600 proceeds to operation 608, where the user device 104 receives the vibration signal(s) 112A-112D, via the device side transducer(s) 116, and the reference signal(s) 122, via the wireless connection 132. From operation 608, the method 600 proceeds to operation 610, where the user device 104 compares the vibration signal(s) 112A-112D and the reference signal(s) 122 to determine how the user device 104 is being held by the user. For example, the signal detection and analysis application 120 can isolate the signal contributions of the vibration signal(s) 112A-112D from each of the fingers 124 received at each of the device side transducers 116 into unique signal contributions. By comparing the time differences for each unique signal contribution between the device side transducers 116, the signal detection and analysis application 120 can determine the relative location of each of the sources (i.e., each of the fingers 124). By comparing the unique signal contributions to the reference signal(s) 122 and, in some embodiments, using reference information describing the impacts each finger 124 has on a transmitted signal, the signal detection and analysis application 120 can associate each source with a specific one of the fingers 124, which can then be used to describe how the user device 104 is being held by the user.

From operation 610, the method 600 proceeds to operation 612. The method 600 ends at operation 612.

Figure 7:
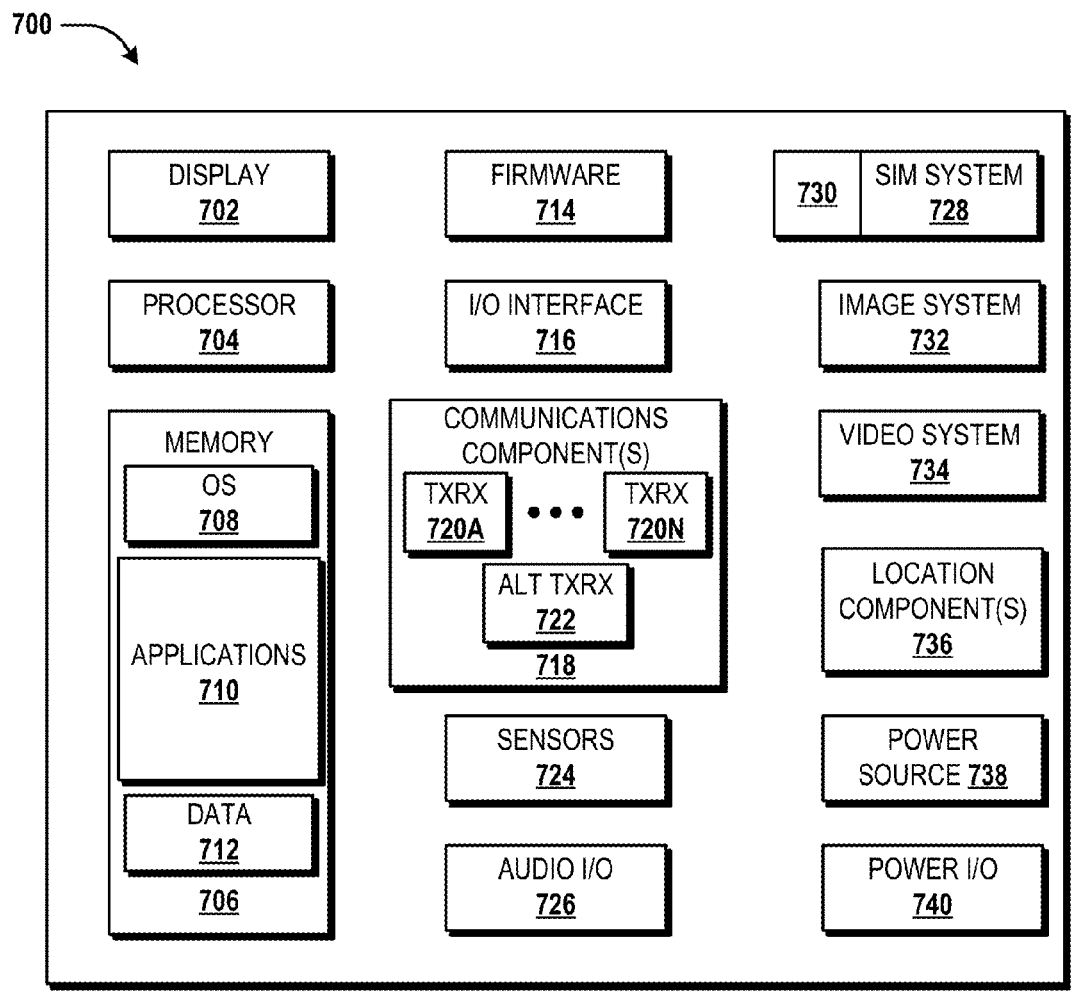
FIG. 7 is a block diagram illustrating an example mobile device capable of implementing aspects of the embodiments disclosed herein.

Turning now to FIG. 7, an illustrative mobile device 700 and components thereof will be described. In some embodiments, the user device 104 described above can be configured as and/or can have an architecture similar or identical to the mobile device 700 described herein in FIG. 7. It should be understood, however, that the user device 104 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements, text, images, video, advertisements, various prompts, virtual keypads and/or keyboards, messaging data, notification messages, metadata, internet content, device status, time, date, calendar data, device preferences, map and location data, combinations thereof, and the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708 (e.g., the operating system 130), one or more applications 710 (e.g., the signal detection and analysis application 120 and the application(s) 128), other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, viewing account information, answering/initiating calls, entering/deleting data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include user preferences, user settings, the baseline signal storage component, and/or other data. The applications 710 can include, for example, the signal detection and analysis application 120, the application(s) 128, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, user information, organization information, presence status information, user IDs, passwords, and application initiation (start-up) requests. In some embodiments, the I/O interface 716 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using Global System for Mobile communication ("GSM"), Code Division Multiple Access ("CDMA"), CDMAONE, CDMA2000, Long-Term Evolution ("LTE"), and various other 2G, 2.5G, 3G, 4G, and greater generation technology standards. Moreover, the communications component 718 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency-Division multiplexing ("OFDM"), Space-Division Multiple Access ("SDMA"), and the like.

In addition, the communications component 718 may facilitate data communications using Generic Packet Radio Service ("GPRS"), Enhanced Date Rates for GSM Evolution ("EDGE"), the High-Speed Packet Access ("HSPA") protocol family, including High-Speed Downlink Packet Access ("HSDPA"), Enhanced Uplink ("EUL") or otherwise termed Highs-Speed Uplink Packet Access ("HSUPA"), HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, IRDA, NFC, other RF technologies, combinations thereof, and the like.

In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
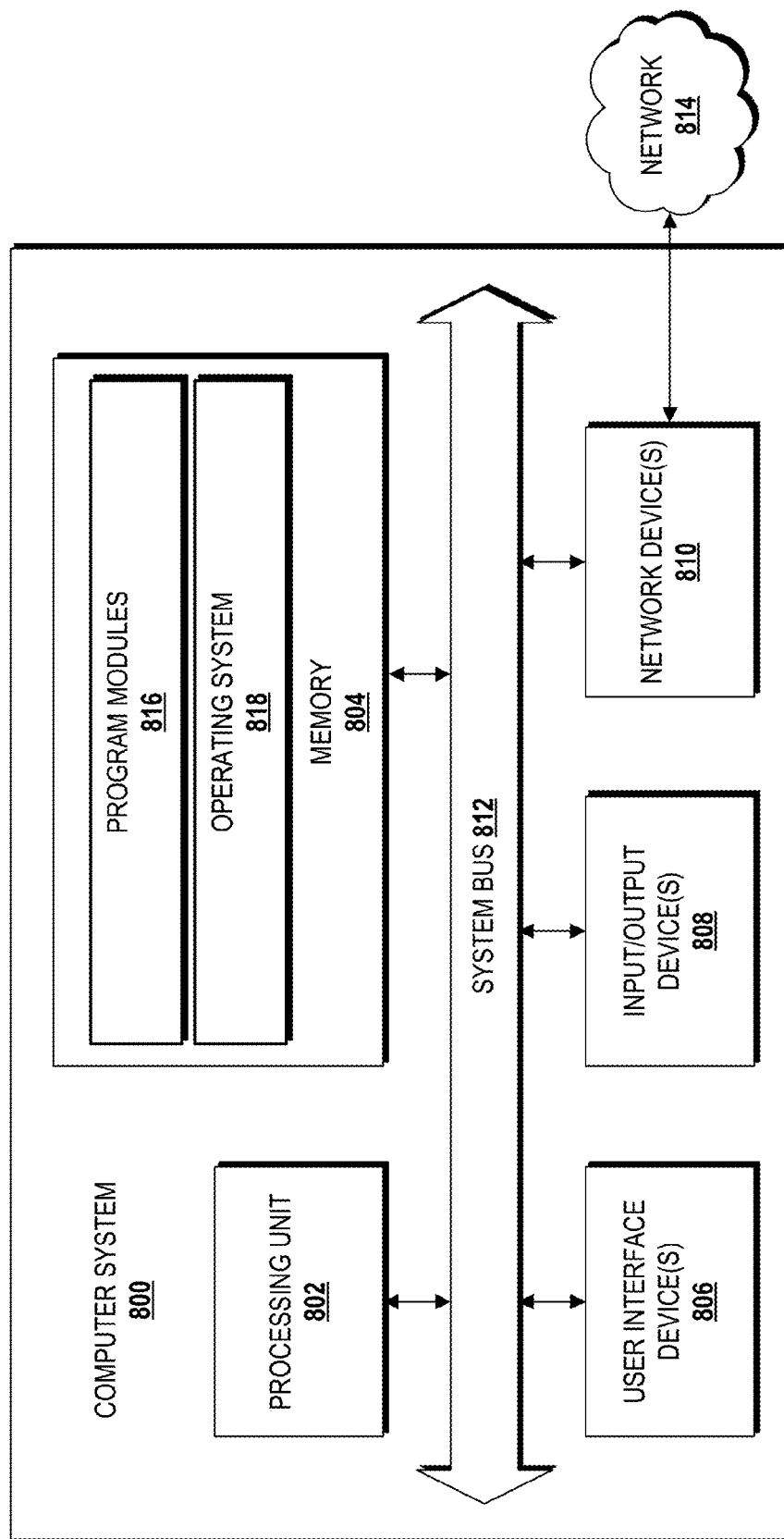
FIG. 8 is a block diagram illustrating an example computer system capable of implementing aspects of the embodiments presented herein.

FIG. 8 is a block diagram illustrating a computer system 800 configured to provide the functionality in accordance with various embodiments of the concepts and technologies disclosed herein. In some implementations, the user device 104 is configured to utilize an architecture that is the same as or similar to the architecture of the computer system 800. It should be understood, however, that modification to the architecture may be made to facilitate certain interactions among elements described herein.

The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 818 (e.g., the operating system 130) and one or more program modules 816. The operating system 818 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 816 may include various software and/or program modules to perform the various operations described herein. The program modules 816 can include, for example, the signal detection and analysis application 120 and/or the application(s) 128. The program modules 816 and/or other programs can be embodied in computer-readable media containing instructions that, when executed by the processing unit 802, perform one or more of the operations described herein. According to embodiments, the program modules 816 may be embodied in hardware, software, firmware, or any combination thereof. Although not shown in FIG. 8, it should be understood that the memory 804 can be or can include the baseline signal storage component. The memory 804 can also store other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network 814. Examples of the network devices 810 include, but are not limited to, a modem, a radio frequency ("RF") or IR transceiver, a telephonic interface, a bridge, a router, or a network card. The network 814 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 814 may be a wired network such as, but not limited to, a Wide Area Network ("WAN"), a wired LAN such as provided via Ethernet, a wired Personal Area Network ("PAN"), or a wired Metropolitan Area Network ("MAN").

Figure 9:
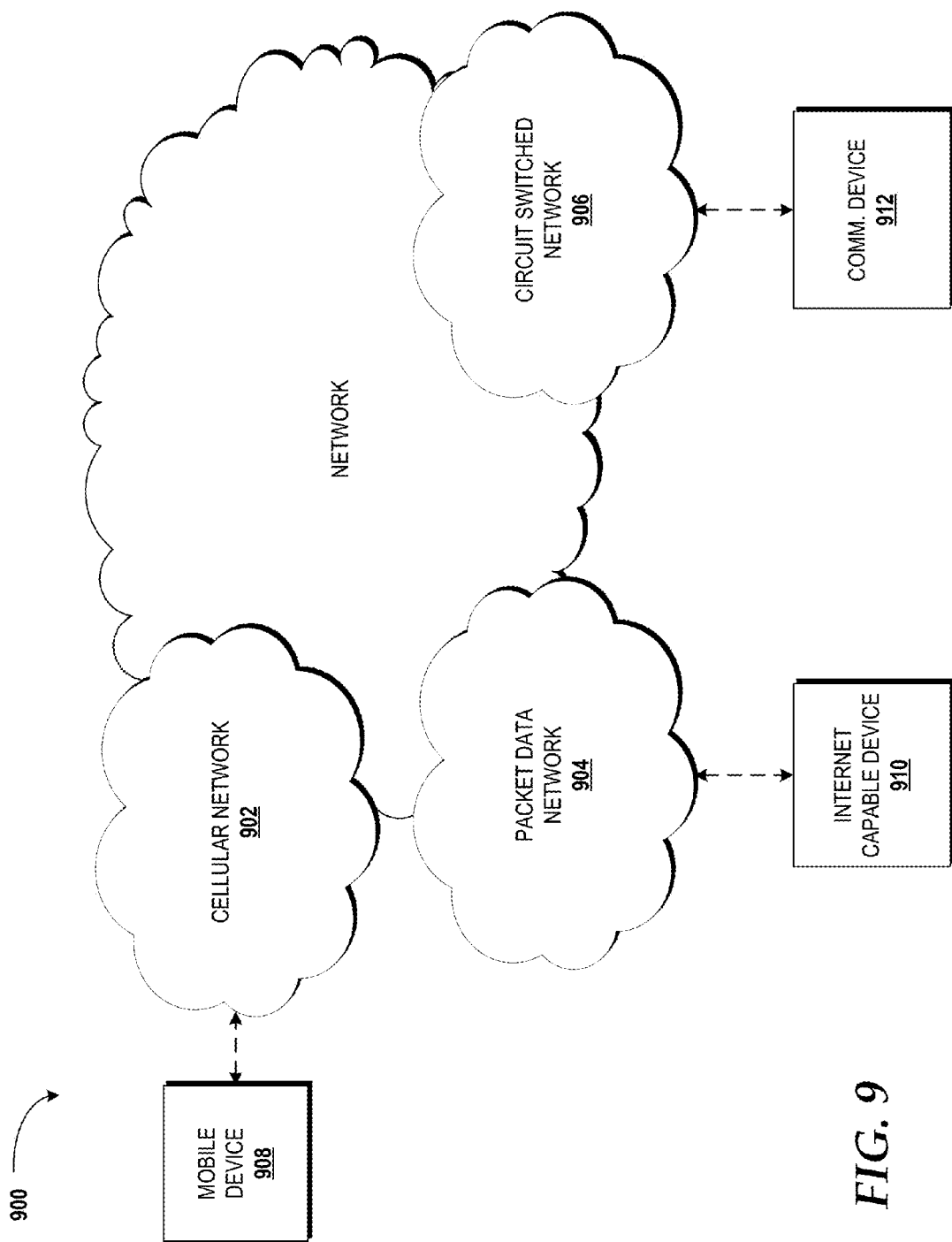
FIG. 9 schematically illustrates a network, according to an illustrative embodiment.

Turning now to FIG. 9, details of a network 900 will be described, according to an illustrative embodiment. The network 900 includes a cellular network 902, a packet data network 904, for example, the Internet, and a circuit switched network 906, for example, a publicly switched telephone network ("PSTN"). The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, a cellular telephone, a user equipment, a mobile terminal, a PDA, a laptop computer, a handheld computer, the user device 104, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards such as LTE, or the like, as well as evolved and future mobile standards.

The packet data network 904 includes various devices, for example, servers, computers, databases, and other devices in communication with another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system ("POTS"). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, the user device 104, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, the user device 104, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910.

Based on the foregoing, it should be appreciated that concepts and technologies directed to device hold determination using bone conduction have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A computer storage medium that stores computer-readable instructions that, when executed by a processor of a user device, cause the processor to perform operations comprising:
   receiving a reference signal;
   receiving, via a device side transducer of the user device, a bone conduction signal from a user side transducer, wherein the bone conduction signal has propagated through a bone of a user associated with the user device; and
   analyzing, the bone conduction signal to determine how the user device is being held by the user, wherein analyzing comprises comparing the bone conduction signal to the reference signal to associate the bone conduction signal with at least a portion of a hand of the user to determine how the user device is being held in the hand of the user.

2. The computer storage medium of claim 1, wherein the operations further comprise exposing data regarding how the user device is being held by the user to an application that is executable by the processor of the user device, to an application that is external to the user device, to an operating system that is executable by the processor of the user device, or to a website.

3. The computer storage medium of claim 1, wherein the device side transducer of the user device is built-in to the user device, attached to the user device, built-in to a case of the user device, built-in to a display of the user device, or built-in to a component of the user device.

4. The computer storage medium of claim 1, wherein the user side transducer is built-in to a device worn by the user, attached to a device worn by the user, attached to or worn directly by the user, or disposed underneath the skin or within a body of the user.

5. The computer storage medium of claim 1, wherein the operations further comprise triggering the user side transducer to send the bone conduction signal.

6. The computer storage medium of claim 5, wherein triggering the user side transducer to send the bone conduction signal comprises sending a signal trigger to the user side transducer via a connection established between the user device and the user side transducer.

7. The computer storage medium of claim 1, wherein the operations further comprise:
   receiving, via a further device side transducer of the user device, a further bone conduction signal from the user side transducer, wherein the further bone conduction signal has propagated through a further bone of the user associated with the user device; and
   analyzing the further bone conduction signal to further determine how the user device is being held by the user.

8. The computer storage medium of claim 7, wherein analyzing the further bone conduction signal to determine how the user device is being held by the user comprises comparing the further bone conduction signal to the reference signal to associate the further bone conduction signal with at least a further portion of the hand of the user to further determine how the user device is being held in the hand of the user.

9. The computer storage medium of claim 1, wherein the operations further comprise:
   receiving output from a sensor; and
   analyzing the output from the sensor to determine how the user device is being held by the user.

10. A user device comprising:
    a device side transducer;
    a processor; and
    a memory that stores instructions that, when executed by the processor, cause the processor to perform operations comprising:
       receiving a reference signal;
       receiving, via the device side transducer, a bone conduction signal from a user side transducer, wherein the bone conduction signal has propagated through a bone of a user associated with the user device; and
       analyzing the bone conduction signal to determine how the user device is being held by the user, wherein analyzing comprises comparing the bone conduction signal to the reference signal to associate the bone conduction signal with at least a portion of a hand of the user to determine how the user device is being held in the hand of the user.

11. The user device of claim 10, wherein the instructions, when executed by the processor, cause the processor to perform further operations comprising exposing data regarding how the user device is being held by the user to an application that is executable by the processor, to an application that is external to the user device, to an operating system that is executable by the processor, or to a website.

12. The user device of claim 10, wherein the device side transducer is built-in to the user device, attached to the user device, or built-in to a case of the user device, built-in to a display of the user device, or built-in to a component of the user device.

13. The user device of claim 10, wherein the instructions, when executed by the processor, cause the processor to perform further operations comprising triggering the user side transducer to send the bone conduction signal.

14. The user device of claim 13, wherein triggering the user side transducer to send the bone conduction signal comprises sending a signal trigger to the user side transducer via a connection established between the user device and the user side transducer.

15. The user device of claim 10, further comprising a further device side transducer; and wherein the instructions, when executed by the processor, cause the processor to perform further operations comprising:
receiving, via the further device side transducer, a further bone conduction signal from the user side transducer, wherein the further bone conduction signal has propagated through a further bone of the user associated with the user device; and
analyzing the further bone conduction signal to further determine how the user device is being held by the user.

16. The user device of claim 15, wherein analyzing the further bone conduction signal to determine how the user device is being held by the user comprises comparing the further bone conduction signal to the reference signal to associate the further bone conduction signal with at least a further portion of the hand of the user to further determine how the user device is being held in the hand of the user.

17. A computer storage medium that stores instructions that, when executed by a processor of a user device, cause the processor to perform operations comprising:
presenting a user interface on a display of the user device;
receiving data regarding how the user device is being held by a user, wherein the data is based upon comparing a bone conduction signal to a reference signal to associate the bone conduction signal with at least a portion of a hand of the user, and thereby reflecting how the user device is being held in the hand of the user;
causing the user interface of to be modified to accommodate how the user device is being held by the user; and
presenting the user interface as modified to accommodate how the user device is being held by the user on the display.

18. The computer storage medium of claim 17, wherein the operations further comprise:
receiving input via the user interface as modified to accommodate how the user device is being held by the user; and
causing an operation to be performed in response to the input.

* * * * *